United States Patent
Steurer

(10) Patent No.: US 10,144,122 B2
(45) Date of Patent: Dec. 4, 2018

(54) ELECTRIC MACHINE TOOL AND METHOD FOR CONTROLLING THE ELECTRIC MACHINE TOOL

(71) Applicant: Robert Bosch GmbH, Stuttgart (DE)

(72) Inventor: Christoph Steurer, Urbach (DE)

(73) Assignee: ROBERT BOSCH GMBH, Stuttgart (DE)

(*) Notice: Subject to any disclaimer, the term of this patent is extended or adjusted under 35 U.S.C. 154(b) by 693 days.

(21) Appl. No.: 14/167,763

(22) Filed: Jan. 29, 2014

(65) Prior Publication Data

US 2014/0216773 A1 Aug. 7, 2014

(30) Foreign Application Priority Data

Feb. 1, 2013 (DE) .................. 10 2013 201 708

(51) Int. Cl.
  *B25F 5/00* (2006.01)
  *B23Q 11/00* (2006.01)

(52) U.S. Cl.
  CPC .......... *B25F 5/00* (2013.01); *B23Q 11/0085* (2013.01); *B23Q 11/0092* (2013.01)

(58) Field of Classification Search
  CPC ... B25F 5/00; B25F 5/026; B25F 5/02; B23Q 11/0092; B23Q 11/0085; B23Q 11/0078
  See application file for complete search history.

(56) References Cited

U.S. PATENT DOCUMENTS

| | | | | |
|---|---|---|---|---|
| 5,914,882 A | * | 6/1999 | Yeghiazarians | F16P 3/00 408/1 R |
| 6,868,919 B1 | * | 3/2005 | Manschitz | B25D 16/006 173/47 |
| 2007/0084613 A1 | * | 4/2007 | Zhang | B23D 59/001 173/1 |
| 2009/0065225 A1 | * | 3/2009 | Forster | B23Q 11/04 173/2 |
| 2010/0257743 A1 | * | 10/2010 | George | B27B 17/083 30/383 |
| 2011/0114345 A1 | * | 5/2011 | Schlesak | B23Q 11/0092 173/1 |

* cited by examiner

*Primary Examiner* — Thanh Truong
*Assistant Examiner* — Thomas Wittenschlaeger
(74) *Attorney, Agent, or Firm* — Norton Rose Fulbright US LLP; Gerard Messina

(57) ABSTRACT

In a method for controlling an electric machine tool having an electric motor for driving a rotating insertion tool, the electric machine tool is operated in one of multiple operating modes, and at least one parameter of the machine tool is detected. The instantaneous operating state of the electric machine tool is ascertained and evaluated based on the detected parameter. A protective function is activated when the presence of a critical operating situation is recognized during the evaluation of the instantaneous operating state. The instantaneous operating mode of the electric machine tool is detected, and the evaluation of the instantaneous operating state is adapted in each case to the instantaneous operating mode.

8 Claims, 4 Drawing Sheets

ELECTRIC MACHINE TOOL AND METHOD FOR CONTROLLING THE ELECTRIC MACHINE TOOL

BACKGROUND OF THE INVENTION

1. Field of the Invention

The present invention relates to an electric machine tool having an electric motor for driving a rotating insertion tool, and to a method for controlling the electric machine tool.

2. Description of the Related Art

Electric machine tools such as drills or hammer drills are equipped with exchangeable insertion tools which are typically driven in a rotating manner by an electric motor of the machine tool. During operation of such a hand tool, the torque which occurs at the machine due to the rotation of the insertion tool is compensated for by a countertorque to be applied by the user. Depending on the operating situation, the torque load on the user may vary greatly. In particular, very high torque peaks may occur under unfavorable conditions. This is the case, for example, for a so-called kickback event in which the insertion tool becomes jammed in the workpiece. In particular for high-power machine tools, these torque peaks may represent hazardous working situations for the user. However, even for less high-power machine tools which are operated at a very high rotational speed, very large accelerations which last for several milliseconds may occur about the rotational axis of the electric tool due to the high level of rotational energy that is present in the system when the insertion tool suddenly becomes jammed.

To avoid the hazardous kickback situations, recent machine tools are equipped with appropriate protective functions which reduce the power of the drive motor when a sudden increase in torque occurs. Such a protective function is always activated according to the same criteria, regardless of the operating state or operating situation. Thus, for example, the kickback protective function is activated at a relatively low rotational speed when the insertion tool becomes jammed during operation of the machine tool, although the user himself would have sufficient time to release the machine tool switch being pressed by the user. On the other hand, in certain cases it is not possible to recognize, or correctly recognize, occurring kickback events based on the predefined evaluation criteria.

BRIEF SUMMARY OF THE INVENTION

It is an object of the present invention, therefore, to improve the operability of a machine tool.

According to the present invention, a method for controlling an electric machine tool having an electric motor for driving a rotating insertion tool is provided, the electric machine tool being operated in one of multiple operating modes, and at least one parameter of the machine tool being detected. The instantaneous operating state of the electric machine tool is ascertained and evaluated based on the detected parameter, a protective function being activated when the presence of a critical operating situation is recognized during the evaluation of the instantaneous operating state. It is provided that the instantaneous operating mode of the electric machine tool is detected, and the evaluation of the instantaneous operating state is adapted in each case to the instantaneous operating mode. The use of different evaluation methods in the various operating modes allows the evaluation of the instantaneous operating state to be coordinated with the particular circumstances of the various operating modes. By adapting the evaluation method to the various operating modes, it may be ensured that the occurrence of a critical operating situation is reliably recognized in each of the various operating modes. In addition, depending on the operating mode, the response of the safety function may be made according to different categories of severity. Thus, it is possible on the one hand to improve user safety, and on the other hand to simplify the operation of the machine tool.

According to one specific embodiment, it is provided that different evaluation methods and/or evaluation devices are associated in each case with the various operating modes of the electric machine tool. Particularly reliable recognition or detection of critical operating situations is thus made possible, since the different evaluation methods or evaluation devices are better able to take the individual operating conditions in the various operating modes into account. The use of multiple evaluation devices also allows a particularly rapid response by the control device, since the individual evaluation devices may be optimized with regard to the particular critical event.

Another specific embodiment provides that a kickback event caused by jamming of the rotating insertion tool in the machine tool is recognized as a critical operating situation, the activation of the protective function causing a reduction in the power consumption of the electric motor or complete switching off of the electric motor. Since such a kickback event is associated with a strong deflection of the machine tool, the risk to the user of the machine tool may be reduced by reducing the power consumption of the electric motor or by completely switching off the electric motor.

According to another specific embodiment, it is provided that in one operating mode, the rotational motion of the electric machine tool about a rotational axis of the insertion tool is monitored as the operating state, and for this purpose the instantaneous rotational acceleration or rotational rate of the machine tool is detected as the parameter. In addition, the protective function is activated when the rotational acceleration of the electric machine tool exceeds an acceleration threshold value associated with the particular operating mode, or the rotational rate exceeds a rotational rate threshold value associated with the particular operating mode. The activation of the protective function in an acceleration mode characterized by acceleration of the electric motor from a standstill to a predefined rotational speed is thus suppressed. In this way, the situation may be prevented that an increase in torque which occurs solely due to the acceleration of the electric motor or due to the increasing friction between the insertion tool and the workpiece is erroneously recognized as a critical operating situation.

In another specific embodiment, it is provided that the safety function is activated in an acceleration mode characterized by acceleration of the electric motor from a standstill to a predefined rotational speed when a deflection angle of the machine tool, which is ascertained by mathematical integration over time of the rotational motion of the electric machine tool about the rotational axis of the insertion tool, exceeds a predefined maximum deflection angle threshold value. Critical operating situations such as jamming of the insertion tool in the workpiece may also be detected in such cases when, due to a slowly rotating machine, the jamming does not result in a jerking deflection of the machine tool, as is generally common. The operational reliability of the machine tool may thus be further increased.

According to another specific embodiment, it is provided that a rotational acceleration of the electric machine tool about the rotational axis is detected as the operating state, the protective function being activated in an idle mode as soon as the detected rotational acceleration of the electric machine tool exceeds a predefined first acceleration threshold value for a predefined first minimum time period. By linking the acceleration to time, the operating state of the machine tool may be assessed much more accurately.

In another specific embodiment, it is provided that the protective function is activated, in a load mode which follows the idle mode and which is characterized by gradual deceleration of the electric motor from idle speed, as soon as the detected rotational acceleration of the electric machine tool exceeds a predefined second acceleration threshold value, which is less than the first acceleration threshold value in idle mode, for a predefined second minimum time period which is longer than the first minimum time period in idle mode, and/or when a deflection angle of the electric machine tool, ascertained by mathematical integration, exceeds a predefined deflection angle threshold value. The various conditions in the two operating modes are thus optimally taken into account, since the protective function is already activated in the rapidly rotating idle mode during short-term deflections, when the corresponding deflection is particularly great. In contrast, in the slowly rotating load mode, the protective function is already activated at a lower threshold, when the corresponding deflection lasts longer.

In addition, another specific embodiment is provided in which the protective function is deactivated in a chiseling mode in which the insertion tool undergoes a translational motion.

Unnecessarily switching off in this operating mode may thus be effectively avoided.

The present invention is described in greater detail below with reference to the drawings.

DETAILED DESCRIPTION OF THE INVENTION

Figure 1:
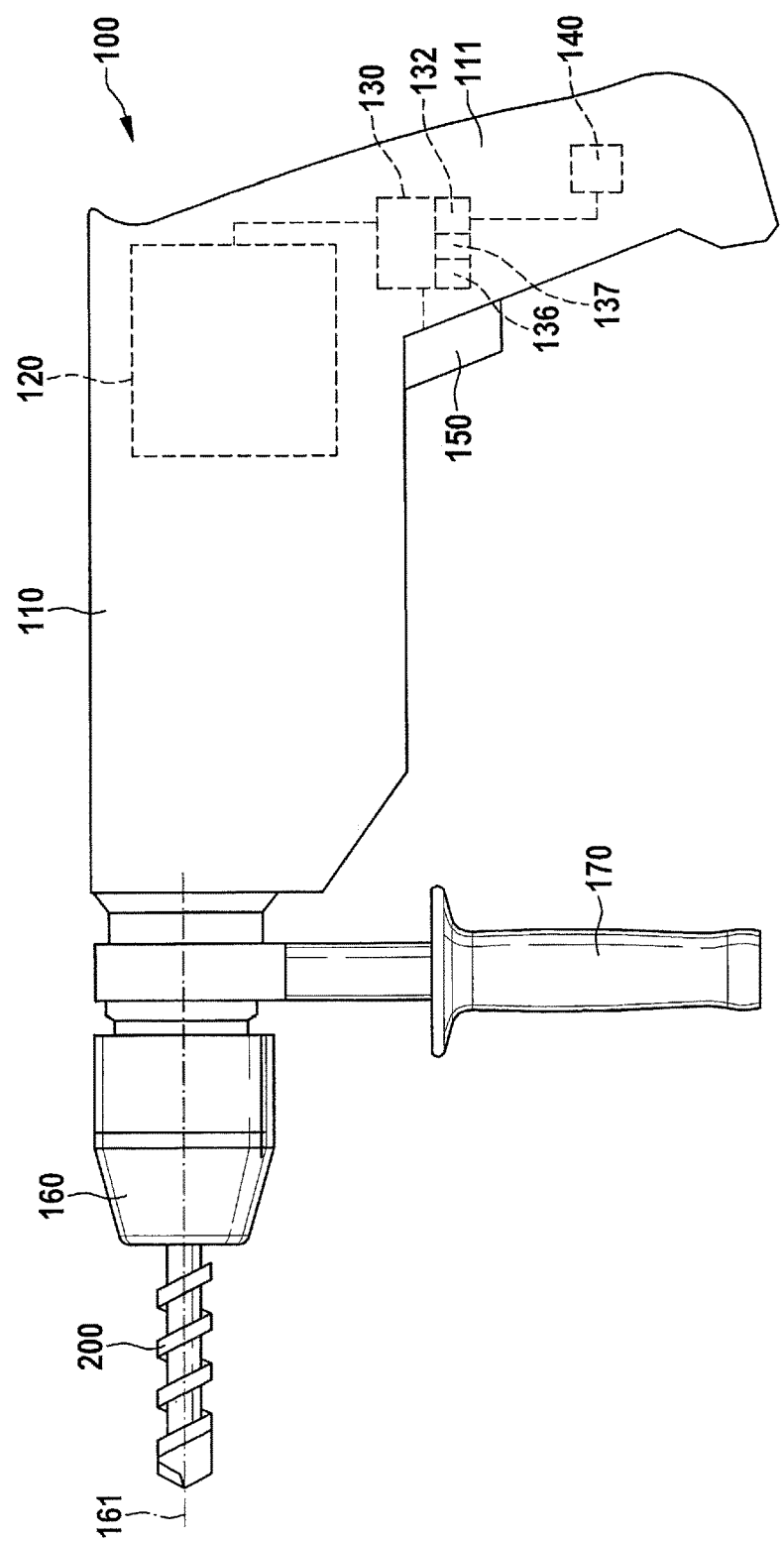
FIG. 1 schematically shows an electric machine tool in the form of a drill having devices for recognizing kickback events.

Electric machine tools having exchangeable insertion tools, for example drills, hammer drills, cordless screwdrivers, cordless drills, or similar devices equipped with appropriate insertion tools, are typically equipped with a high-power electric motor for driving the insertion tool. FIG. 1 shows an example of a machine tool 100 designed as a drill, having an insertion tool 200 which is designed as a drill bit and which is fastened in a drill chuck 160 of drill 100. Drill 100 has a typical housing 110 with a housing section which forms a handle 111. Electric motor 120 accommodated in the middle part of device housing 110 drives insertion tool 200 clamped in drill chuck 160, in a rotating manner about a predefined rotational axis 161, typically via a conversion gear (not illustrated here). For controlling the operation of electric motor 120, drill 100 has a control device 130 and at least one control element 150, which in FIG. 1 is designed as a main switch as an example only, via which the particular user may specify the operating mode. Based on the user input, control device 130 controls a power electronics system, not illustrated in greater detail here, which in turn determines the energy supply to electric motor 120. Various torques may be implemented at insertion tool 200 as a function of the particular energy supply, in each case different rotational speeds of insertion tool 200 resulting, typically as a function of the particular load.

Due to acceleration processes of drill 100 and friction forces between insertion tool 200 and a workpiece, torques occur at drill 100 which usually must be compensated for by a countertorque to be applied on handle 111 by the user. Higher torques frequently require an auxiliary handle 170, which is generally fastenable at the front section of drill housing 110, essentially radially with respect to rotational axis 161.

To unambiguously detect a kickback event which is caused by jamming of insertion tool 200 in the workpiece and which is perceivable as a jerking deflection of drill 100 about rotational axis 161, drill 100 also has a sensor device 140. Sensor device 140, which is situated in handle 111, for example, includes at least one sensor 141, 142 for detecting at least one parameter of drill 100. In particular an inertial sensor, such as an acceleration sensor, yaw rate sensor, and/or position sensor, is suitable as sensor 141, 142. In addition, a combined sensor may be used for this purpose for detecting the instantaneous acceleration, rotational speed, or deflection of drill 100.

Based on the sensor information provided by sensor device 140, control device 130 may determine the instantaneous operating state of drill 100 and correspondingly reduce the power of electric motor 120 when a kickback event or other critical operating states occur(s). Control device 130 has at least one evaluation device 132 for evaluating the parameter and the instantaneous operating state thus ascertained in each case, with the aid of the sensor device. Such an evaluation device 132 may be implemented in the form of software, hardware, or a combination of software and hardware.

Control device 130 is designed to carry out the evaluation of the instantaneous operating state as a function of the instantaneous operating mode of drill 100. In particular the evaluation strategy, with the aid of which certain critical events such as the deflection of the drill are recognized, is selected as a function of the particular instantaneous operating mode. A certain acceleration event which has been assessed as noncritical in a first operating mode may be assessed as critical in a second operating mode, so that for identical or similar acceleration events, different responses by control device 130 are possible, depending on the operating mode.

Electric machine tool 100 typically has various operating states with which preferably individual evaluation methods or evaluation concepts are associated for the reliable recognition of critical operating cases. Thus, for example, for a cordless hammer drill, a simple drill operation as well as a hammer drill operation is available. Since in the hammer drill operation an additional longitudinal motion of the drilling tool takes place in addition to the rotational motion, in this operating mode jamming of the drilling tool in the workpiece is less likely in comparison to mere drill operation. Therefore, deflections of machine tool 100 in the hammer drill operating mode may be assessed with much greater tolerance. Thus, for example, the acceleration threshold value above which a deflection of machine tool 100 is assessed as a critical operating case may be set higher in the hammer drill mode than in the mere drill mode.

In addition, the acceleration phase directly after pressing main switch 150, in which insertion tool 200 is accelerated from a standstill to a predefined rotational speed, may be regarded as a separate operating mode. In this start-up or acceleration mode, an individually coordinated evaluation method, corresponding to this specific operating mode, for recognizing kickback events may be available to control device 130. In particular, the torque threshold value or deflection angle threshold value, above which a kickback event is assessed as a critical operating case and as the result of which appropriate safety measures are initiated, may be increased. Alternatively, the evaluation of the operating state or the recognition of critical events in the acceleration mode may also be completely suppressed. The situation may thus be efficiently prevented that an event which is harmless per se, such as the sudden loosening of a tight screw, results in switching off of electric motor 120 or a reduction in the motor power.

Control device 130 may include a separate detection device 136 for detecting the instantaneous operating mode of machine tool 100.

For evaluating the sensor information, control device 130 has at least one evaluation device 132 which includes one or multiple different evaluation circuits 133, 134 for implementing various evaluation methods or evaluation concepts, depending on the application. A significant advantage of multiple evaluation circuits 133, 134 is that there is an option for providing optimally adapted evaluation circuits 133, 134 in each case for the various tasks. In contrast, the hardware outlay may be greatly reduced with the aid of a shared evaluation circuit 133, 134 for evaluating the operating state in the various operating modes.

Circuits composed of discrete individual components as well as integrated circuits, such as a microprocessor, may be used for evaluation circuits 133, 134. In particular with the aid of microprocessors, it is also possible to meaningfully carry out fairly complex analyses of the operating state, using multiple parameters.

In particular, the torque threshold value or deflection angle threshold value above which an occurring kickback event is assessed as a critical operating case and appropriate safety measures are initiated may be increased.

The control device preferably has an adaptation device 137 for adapting the evaluation method, used for recognizing critical operating situations, to the particular instantaneous operating mode. In the case that multiple evaluation circuits 133, 134 are available, this adaptation device 137 may select and activate the evaluation circuit associated with the particular instantaneous operating mode. In contrast, in the case that various operating modes use the same evaluation circuit 133, 134, adaptation device 137 may adapt the evaluation algorithm or the threshold values used for the evaluation in evaluation circuit 133, 134 in question.

Figure 2:
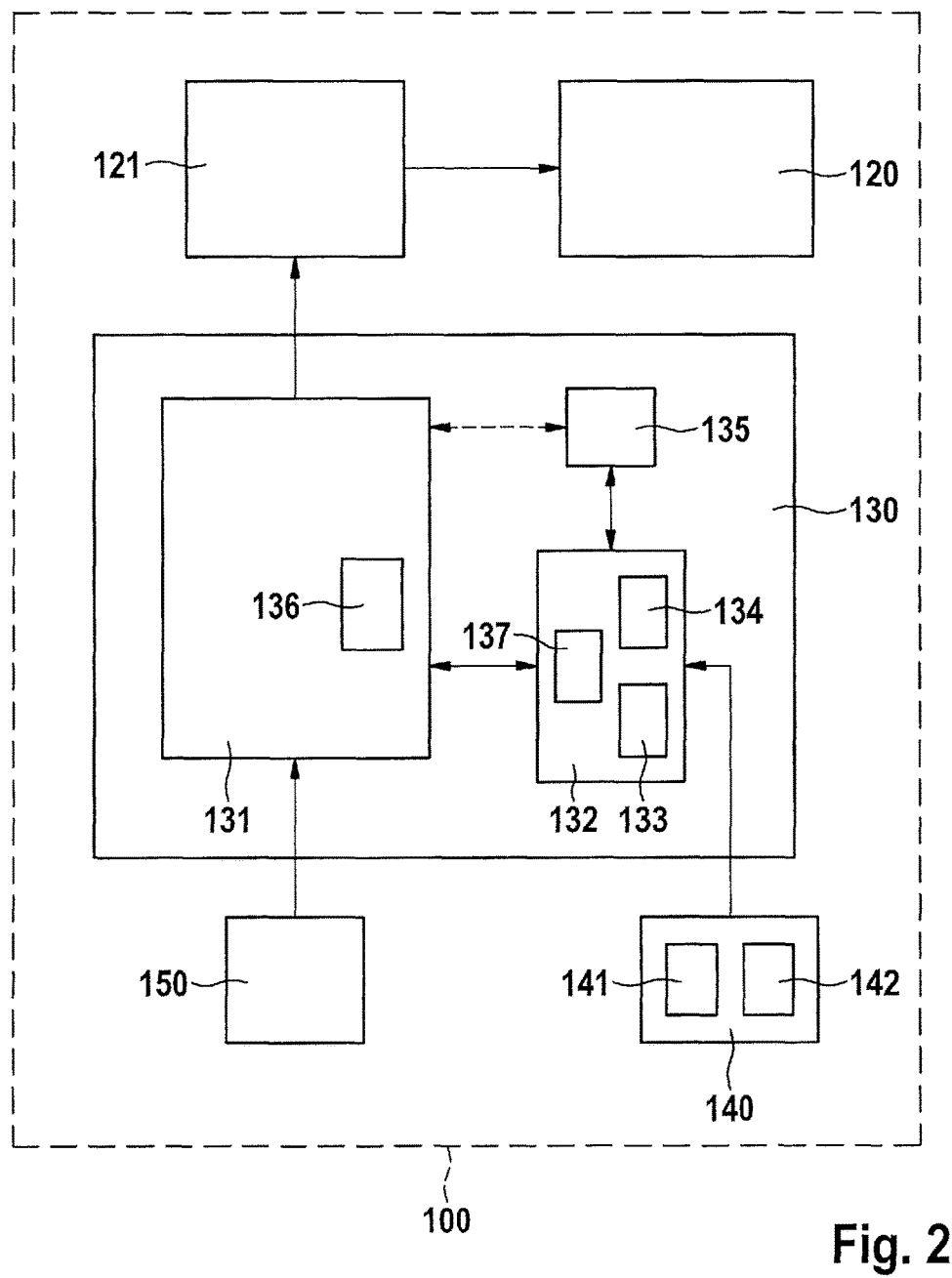
FIG. 2 schematically shows the variation over time of various acceleration events of the electric machine tool.

FIG. 2 shows an example of a block diagram illustration of the electrical components of an electric machine tool 100 according to the present invention. Machine tool 100 includes an electric motor 120, a power electronics system 121 which is electrically connected to electric motor 120, a control device 130 which is electrically connected to the power electronics system, at least one control element 150 which is connected to control device 130, and at least one sensor device 140 which is connected to control device 130. Control device 130 includes a control circuit 131 for controlling power electronics system 121, as well as an evaluation circuit 132 for evaluating the sensor information provided by sensor device 140. In addition, control device 130 illustrated here as an example includes a memory device 135 which is connected to evaluation device 132 or optionally also connected to control circuit 131. Depending on the application, control circuit 131, evaluation device 132, and memory device 135 illustrated as function blocks in FIG. 2 may also be implemented as separate components on one or multiple printed circuit boards, or in the form of integrated microcircuits on a shared substrate.

During operation of machine tool 100, control circuit 131 controls electric motor 120 via power electronics system 121 according to the user input via control element 150. Evaluation circuit 132 monitors the operating state of machine tool 100 by evaluating the signals of sensor device 140. Beforehand, a detection device 136 which is designed, for example, as a separate functional unit of control circuit 131 initially ascertains the instantaneous operating mode of machine tool 100 and transmits same in the form of suitable information to an adaptation device 137 which is designed, for example, as a separate functional unit of evaluation device 132. Adaptation device 137 subsequently selects an evaluation method, associated with the particular operating mode, for evaluating the instantaneous operating state of the drill. Various evaluation methods may be implemented with the aid of a shared evaluation circuit, using various evaluation algorithms or different settings, or also using various evaluation circuits 133. A computing device, such as a microprocessor, on which a particular evaluation program is executed is preferably used as evaluation circuit 133, 134. The particular program or the algorithms and parameters used by the program may be stored in a memory device 135 and read into the microprocessor as needed.

According to the present invention, different evaluation methods and evaluation concepts are associated with various operating states to enable optimal recognition of a critical operating case, for example a kickback event, in each operating mode. The various operating states or operating modes may be a function of the instantaneous rotational speed and also of the set type of operation, such as drilling, hammer drilling, etc. For implementing various evaluation methods, different threshold values of the observed parameters may be used in the various operating modes, the instantaneous operating state then being assessed in each case as critical when the observed parameter exceeds the particular applicable threshold value. In particular, the rotational acceleration and the deflection angle of the hand tool about the rotational axis of the insertion tool are suitable as parameters for a machine tool having rotating insertion tools. In addition, combinations of various parameters may be used for monitoring the instantaneous operating state of the machine tool.

Figure 3:
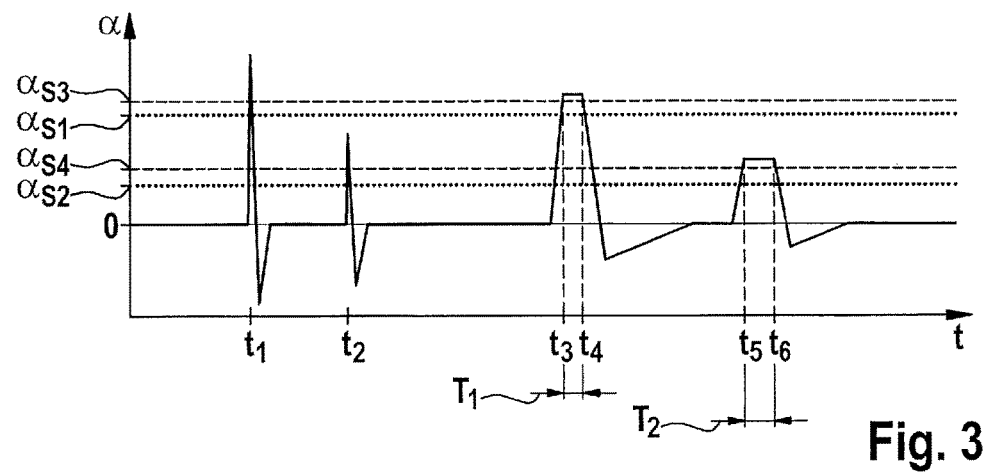
FIG. 3 schematically shows the variation over time of the deflection angle of the electric machine tool, with two different deflections.

FIG. 3 shows an example of the variation over time of measured acceleration $\alpha$ of machine tool 100. Various acceleration events are illustrated, which in each case are assessed differently as a function of the instantaneous operating mode, and which therefore may result in different responses. Accordingly, a sudden acceleration of machine tool 100 occurs at point in time t1, which is depicted in the diagram in FIG. 3 by a steep rise in the parameter of acceleration $\alpha$. At point in time t1, acceleration $\alpha$ exceeds a first acceleration threshold value $\alpha S1$, which in a first operating mode characterized by a low rotational speed is set as the threshold for critical events. Therefore, the first acceleration event is assessed as critical by evaluation device 132 of machine tool 100, and consequently the motor power is reduced by control device 130. In contrast, in the first operating mode, acceleration events in which the rotational acceleration does not reach first acceleration threshold value $\alpha S1$ are assessed as noncritical. However, if the electric machine tool is in a second operating mode which is characterized by a rotational speed that is higher than the first operating mode, the user of the machine tool may possibly have less time to respond to a kickback event. To reduce the risk to the user in the second operating mode which operates at higher rotational speeds, in this operating mode the evaluation algorithm uses a lower acceleration threshold value $\alpha S2$ for evaluating the operating state. Therefore, in the second operating mode, the second acceleration event, in which the measured maximum acceleration exceeds only second acceleration threshold value $\alpha S2$, is also assessed as critical, and consequently the motor power is reduced as a safety measure.

Figure 4:
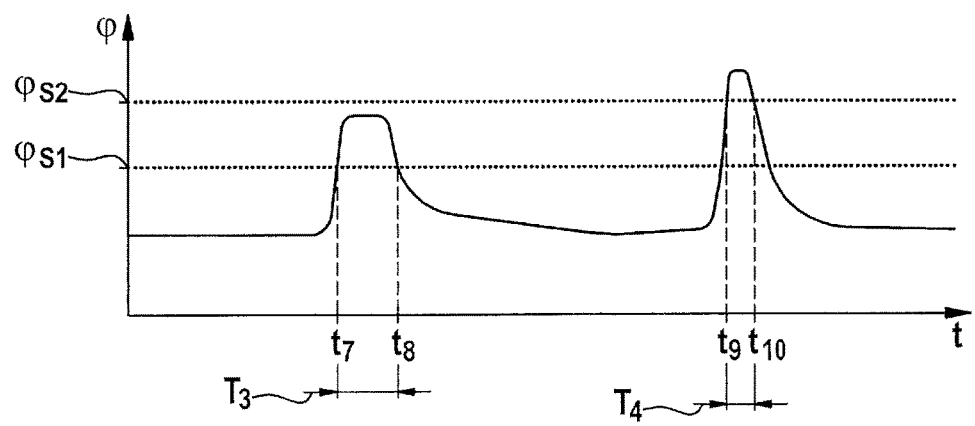
FIG. 4 schematically shows the electric machine tool together with a control device and multiple evaluation devices for recognizing kickback events.

Depending on the operating mode, it may be meaningful to switch from the consideration of an individual parameter, such as the maximum acceleration, the rotational speed, or the deflection, to the consideration of a combination of multiple parameters. In addition to the magnitude of a measured acceleration $\alpha$ of the machine tool, time period T of the particular acceleration is also preferably taken into account. Thus, for example, in an idle operating mode in which the motor turns at idling speed, an acceleration event is assessed as critical only when the measured acceleration exceeds a third acceleration threshold value $\alpha S3$, for example 3 g, at least over a predefined first time period T1, for example 20 ms. In contrast, in a load operating mode subsequent to the idle operating mode, in which the electric tool is gradually decelerated from the idling speed, the parameter set may be adapted in such a way that the acceleration event is assessed as critical only when the measured acceleration exceeds a lower, fourth acceleration threshold value $\alpha S4$, for example 2 g, for a second time period T4, for example 30 ms, which is longer than first time period T1. The acceleration values are in each case dependent on the place of installation of the sensor in the electric vehicle. Alternatively, in the load operating mode a switch may be made to an angle computation in which an operating state is assessed as critical only when deflection angle $\varphi$, which is ascertained by mathematical integration over a predefined time period, exceeds a predefined deflection angle threshold value $\varphi S1$, $\varphi S2$. For this purpose, FIG. 4 shows an example of two different operating cases which have different deflection angle threshold values $\varphi S1$, $\varphi S2$. The operating state in the first operating mode is assessed as critical only when the measured deflection of machine tool 100 exceeds first deflection angle threshold value $\varphi S1$. In contrast, a higher deflection angle threshold value $\varphi S2$ is associated with the second operating mode.

Similarly as for the parameters rotational acceleration $\alpha$ or rotational speed, a linkage with the time period may also be made when deflection angle $\varphi$ of the machine tool is detected. Thus, for example, an operating state in which measured deflection angle $\varphi$ exceeds first deflection angle threshold value $\varphi S1$ for a third time period T3 may be assessed as a critical event. In contrast, in the second operating mode the critical operating state is assessed as critical only when the detected deflection angle exceeds higher deflection angle threshold value $\varphi S2$ for a fourth time period T4 which is shorter than third time period T3.

To prevent a jerk caused by a sudden loosening of a tight screw from resulting in switching off or reduction of the motor power, the time period in which the motor accelerates the insertion tool from a standstill may be defined as a separate operating mode, and in this acceleration mode the recognition of kickback events may be completely suppressed. Alternatively, in the acceleration mode, deflection angle $\varphi$ may be ascertained by integration, and the motor may be switched off when a predefined deflection angle threshold $\varphi S1$, $\varphi S2$ is exceeded. The time period of the acceleration may be ascertained, for example, from a measurement of the minimum time required by the electric tool to accelerate a defined mass to approximately 60% of the idling speed with a fully charged battery. The mass of the insertion tool that is most frequently or most likely used in the particular electric tool may be used as the defined mass.

Figure 5:
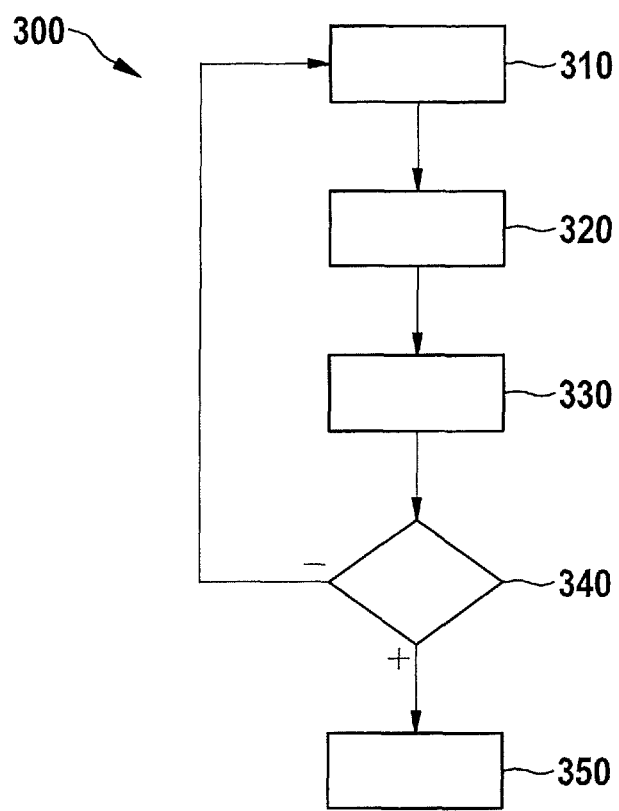
FIG. 5 shows a flow chart of the method according to the present invention.

FIG. 5 shows a schematic flow chart 300 of the method according to the present invention. The instantaneous operating mode of electric machine tool 100 is ascertained in a first method step 310. An evaluation method associated with the particular operating mode is subsequently selected in a second method step 320. This step may include, for example, adapting the evaluation criteria and assessment parameters of evaluation device 132, loading an appropriate program into a microprocessor of evaluation device 132, or selecting or activating an evaluation circuit 133, 134 associated with the particular operating mode. The instantaneous operating state is evaluated with the aid of the particular selected evaluation method in another method step 330. An ascertainment is subsequently made in method step 340 as to whether the instantaneous operating state is a critical operating state.

If this is the case, a user protective function is activated in a further method step 350. However, if the instantaneous operating state is not assessed as critical, the method returns to method step 310 for ascertaining the instantaneous operating mode.

The specific embodiments explained with reference to the figures merely represent preferred or exemplary embodiments of the present invention. In addition to the described and illustrated specific embodiments, other specific embodiments are conceivable which may include further modifications as well as combinations of features. In particular, in the present context the term "operating mode" is to be understood as operating modes which are predefined by control elements and the control device of the electric machine tool, as well as such operating states which are delimitable from one another solely with the aid of certain criteria such as the rotational speed or load state. In addition to the acceleration, deflection, or rotational rate mentioned here, in principle any suitable measurable variable with the aid of which critical operating states may be recognized are appropriate parameters for describing the operating state of the machine tool. These also include, for example, electrical measured variables such as the current intensity and the voltage of electric motor 120, on the basis of which sudden load fluctuations may be well detected. In addition, a combination of various measured variables as well as their development over time may be used for monitoring the operating state of the machine tool.

What is claimed is:

1. A method for controlling an electric machine tool having an electric motor for driving a rotating insertion tool, comprising:
   operating the electric machine tool in one of multiple predefined operating modes;
   detecting an instantaneous operating mode of the electric machine tool;
   detecting at least one parameter of the machine tool;
   evaluating an instantaneous operating state of the electric machine tool based on the at least one detected parameter of the machine tool; and activating a protective function when a presence of a critical operating situation is recognized during the evaluation of the instantaneous operating state;

wherein the evaluation of the instantaneous operating state of the electric machine tool is adapted in each case based on the detected instantaneous operating mode, wherein an instantaneous rotational acceleration of the electric machine tool is detected as the at least one parameter of the electric machine tool, and wherein, a first operating mode characterized by a low rotational speed of the rotating insertion tool has a first acceleration threshold value, and a second operating mode characterized by a high rotational speed of the rotating insertion tool has a second acceleration threshold value, wherein the first acceleration threshold value is higher than the second acceleration threshold value, wherein the protective function is activated if the instantaneous rotational acceleration exceeds the first acceleration threshold value in the first operating mode or exceeds the second acceleration threshold value in the second operating mode.

2. The method as recited in claim 1, wherein at least one of (i) different evaluation methods and (ii) different evaluation circuits are used for evaluating the instantaneous operating state in different operating modes of the electric machine tool.

3. The method as recited in claim 1, wherein a kickback event caused by jamming of the rotating insertion tool in the machine tool is recognized as a critical operating situation, and wherein the activation of the protective function causes one of (i) a reduction in power consumption of the electric motor or (ii) complete switching off of the electric motor.

4. The method as recited in claim 1, wherein in a selected operating mode:
 a rotational motion of the electric machine tool about a rotational axis of the insertion tool is monitored as the operating state;
 a rotational rate of the electric machine tool is detected as the at least one parameter of the electric machine tool; and activation of the protective function during acceleration of the electric motor from a standstill to a predefined rotational speed is suppressed.

5. The method as recited in claim 1, wherein the protective function is activated in an acceleration mode characterized by acceleration of the electric motor from a standstill to a predefined rotational speed when a deflection angle of the machine tool exceeds a predefined maximum deflection angle threshold value, and wherein the deflection angle of the machine tool is ascertained by mathematical integration over time of a rotational motion of the electric machine tool about a rotational axis of the insertion tool.

6. The method as recited in claim 1, wherein a rotational acceleration of the electric machine tool about a rotational axis of the insertion tool is detected as the at least one parameter of the electric machine tool, and wherein the protective function is activated in an idle mode as soon as the detected rotational acceleration of the electric machine tool about a rotational axis of the insertion tool exceeds a predefined first acceleration threshold value for a predefined first minimum time period.

7. The method as recited in claim 6, wherein in a load mode, which follows the idle mode and which is characterized by gradual deceleration of the electric motor from idle speed, the protective function is activated as soon as at least one of (i) the detected rotational acceleration of the electric machine tool about the rotational axis of the insertion tool exceeds a predefined second acceleration threshold value which is less than the predefined first acceleration threshold value, for a predefined second minimum time period which is longer than the predefined first minimum time period, and (ii) a deflection angle of the electric machine tool ascertained by mathematical integration exceeds a predefined deflection angle threshold value.

8. The method as recited in claim 6, wherein the protective function is deactivated in a chiseling mode in which the insertion tool undergoes a translational motion.

* * * * *